(12) United States Patent
Dearman et al.

(10) Patent No.: US 10,198,874 B2
(45) Date of Patent: Feb. 5, 2019

(54) METHODS AND APPARATUS TO ALIGN COMPONENTS IN VIRTUAL REALITY ENVIRONMENTS

(71) Applicant: Google Inc., Mountain View, CA (US)

(72) Inventors: David Dearman, Mountain View, CA (US); Chun Yat Frank Li, Mountain View, CA (US); Erica Morse, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/594,186

(22) Filed: May 12, 2017

(65) Prior Publication Data

US 2017/0330387 A1 Nov. 16, 2017

Related U.S. Application Data

(60) Provisional application No. 62/335,829, filed on May 31, 2016.

(51) Int. Cl.
*G06T 19/20* (2011.01)
*G06F 3/01* (2006.01)
(Continued)

(52) U.S. Cl.
CPC ............ *G06T 19/20* (2013.01); *G02B 27/017* (2013.01); *G06F 3/011* (2013.01); *G06F 3/012* (2013.01);
(Continued)

(58) Field of Classification Search
CPC . G06F 3/011; G06F 3/013; G06F 3/02; G06F 3/0346; G06T 19/20; G06T 2219/2004
(Continued)

(56) References Cited

U.S. PATENT DOCUMENTS 7,301,648 B2 11/2007 Foxlin
7,636,645 B1 12/2009 Yen et al.
(Continued)

FOREIGN PATENT DOCUMENTS

EP 2485119 A2 8/2012
EP 3007496 A1 4/2016
(Continued)

OTHER PUBLICATIONS

International Search Report and Written Opinion for PCT Patent Application No. PCT/US2017/045054, dated Oct. 23, 2017, 16 pages.
(Continued)

*Primary Examiner* — Tony Davis
(74) *Attorney, Agent, or Firm* — Brake Hughes Bellermann LLP

(57) ABSTRACT

Systems, devices, methods, computer program products, and electronic apparatuses for aligning components in virtual reality environments are provided. An example method includes detecting a first input from a handheld controller of a virtual reality system, responsive to detecting the first input, instructing a user to orient a handheld controller in a designated direction, detecting a second input from the handheld controller; and responsive to detecting the second input, storing alignment data representative of an alignment of the handheld controller.

14 Claims, 10 Drawing Sheets

(51) Int. Cl.
*G06F 3/02* (2006.01)
*G06F 3/038* (2013.01)
*G02B 27/01* (2006.01)
*G06F 3/0346* (2013.01)

(52) U.S. Cl.
CPC .............. *G06F 3/02* (2013.01); *G06F 3/0383* (2013.01); *G02B 2027/014* (2013.01); *G02B 2027/0187* (2013.01); *G06F 3/013* (2013.01); *G06F 3/0346* (2013.01); *G06T 2219/2004* (2013.01)

(58) Field of Classification Search
USPC .......................................... 345/173, 690, 156
See application file for complete search history.

(56) References Cited

U.S. PATENT DOCUMENTS

| | | | |
|---|---|---|---|
| 8,678,282 B1 | 3/2014 | Black et al. | |
| 8,961,305 B2 | 2/2015 | Takeda et al. | |
| 9,229,540 B2 | 1/2016 | Mandella et al. | |
| 9,235,241 B2 | 1/2016 | Newham et al. | |
| 9,247,212 B2 | 1/2016 | Bose et al. | |
| 9,551,873 B2 | 1/2017 | Zalewski | |
| 9,606,363 B2 | 3/2017 | Zalewski et al. | |
| 9,613,147 B2 | 4/2017 | Carlson et al. | |
| 9,726,498 B2 | 8/2017 | Meduna et al. | |
| 9,907,103 B2 | 2/2018 | Chen et al. | |
| 9,965,675 B2* | 5/2018 | Schinas .............. | G06K 9/00335 |
| 9,996,975 B2 | 6/2018 | Herman et al. | |
| 2006/0053371 A1* | 3/2006 | Anderson ............... | G06F 3/016 715/701 |
| 2010/0259474 A1* | 10/2010 | Hildreth ................ | G06F 3/0317 345/156 |
| 2011/0029275 A1* | 2/2011 | Kennedy ................. | G01P 21/00 702/141 |
| 2011/0029903 A1* | 2/2011 | Schooleman ........... | G06F 3/011 715/764 |
| 2011/0037712 A1* | 2/2011 | Kim .................... | H04M 1/7253 345/173 |
| 2011/0190052 A1 | 8/2011 | Takeda et al. | |
| 2013/0128022 A1 | 5/2013 | Bose et al. | |
| 2013/0342571 A1* | 12/2013 | Kinnebrew ............. | G06F 3/147 345/633 |
| 2014/0247279 A1 | 9/2014 | Nicholas et al. | |
| 2015/0234456 A1* | 8/2015 | Cho ........................ | G06F 3/011 345/156 |
| 2015/0235453 A1* | 8/2015 | Schowengerdt ...... | G06T 19/006 345/633 |
| 2015/0235583 A1* | 8/2015 | Schowengerdt ....... | G09G 3/007 345/690 |
| 2015/0269780 A1 | 9/2015 | Herman et al. | |
| 2015/0348327 A1 | 12/2015 | Zalewski et al. | |
| 2016/0012643 A1 | 1/2016 | Kezele et al. | |
| 2016/0098095 A1 | 4/2016 | Gonzalez-Banos et al. | |
| 2016/0105923 A1 | 4/2016 | Chen et al. | |
| 2016/0158640 A1* | 6/2016 | Gupta .................. | A63F 13/213 463/3 |
| 2016/0209658 A1 | 7/2016 | Zalewski | |
| 2016/0259030 A1* | 9/2016 | Jiao ......................... | G01S 3/023 |
| 2016/0364013 A1 | 12/2016 | Katz et al. | |
| 2016/0378204 A1 | 12/2016 | Chen et al. | |
| 2017/0123487 A1 | 5/2017 | Hazra et al. | |
| 2017/0243324 A1 | 8/2017 | Mierle et al. | |
| 2017/0244811 A1 | 8/2017 | McKenzie et al. | |
| 2017/0262049 A1* | 9/2017 | Kim ..................... | G02B 27/017 |
| 2017/0277940 A1* | 9/2017 | Vandonkelaar ........ | A63F 13/212 |
| 2017/0287219 A1* | 10/2017 | Poulos .................. | G06T 19/006 |
| 2017/0322623 A1* | 11/2017 | McKenzie .............. | G06F 3/013 |
| 2017/0330387 A1* | 11/2017 | Dearman ................ | G06T 19/20 |
| 2017/0336882 A1* | 11/2017 | Tome .................... | G06F 3/0346 |
| 2017/0337735 A1* | 11/2017 | Goslin .................. | G06T 19/006 |
| 2017/0351094 A1* | 12/2017 | Poulos ............... | G02B 27/0172 |
| 2017/0356282 A1* | 12/2017 | Close ..................... | G01P 15/132 |
| 2017/0357332 A1 | 12/2017 | Balan et al. | |
| 2017/0357333 A1 | 12/2017 | Balan et al. | |
| 2017/0357334 A1 | 12/2017 | Balan et al. | |
| 2017/0358139 A1 | 12/2017 | Balan et al. | |
| 2018/0005441 A1* | 1/2018 | Anderson ............. | G06T 19/006 |
| 2018/0024623 A1 | 1/2018 | Faaborg et al. | |
| 2018/0033204 A1* | 2/2018 | Dimitrov .............. | G06T 19/006 |
| 2018/0061133 A1* | 3/2018 | Wu ......................... | H04W 4/70 |
| 2018/0081439 A1* | 3/2018 | Daniels ................... | G06F 3/016 |
| 2018/0101986 A1 | 4/2018 | Burns et al. | |
| 2018/0107835 A1 | 4/2018 | Clement et al. | |
| 2018/0107839 A1 | 4/2018 | Clement et al. | |
| 2018/0157333 A1 | 6/2018 | Ross et al. | |

FOREIGN PATENT DOCUMENTS

WO 2015/183621 A1 12/2015
WO 2017/197381 A1 11/2017

OTHER PUBLICATIONS

Virtual Reality Annual International Symposium, IEEE Computer Society Press, The Institute of Electrical and Electronics Engineers, Inc. Mar. 1-5, 1997, 237 pages.
"Calibrate the Xbox 360 Kinect Sensor", Microsoft Support (https://support.xbox.com/en-US/xbox-360/accessories/start-calibration), printed Mar. 17, 2016, 4 pages.
"How to Calibrate you Gaming Controller in Windows 10", How to Geek.com (http://www.howtogeek.com/241421/hot-to-calibrate-your-gaming-controller-in-windows-10), printed Mar. 17, 2016, 8 pages.
International Search Report and Written Opinion for PCT Patent Application No. PCT/US2017/032635, dated Jul. 19, 2017, 10 pages.

* cited by examiner

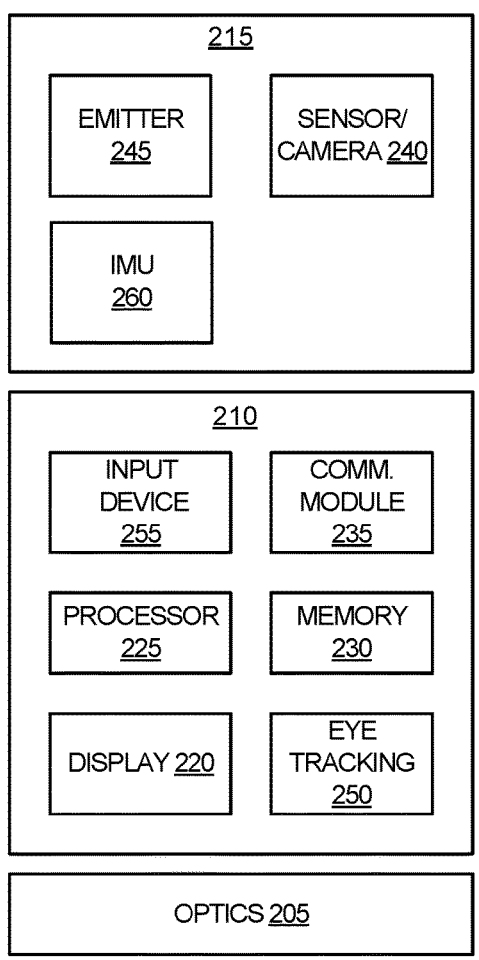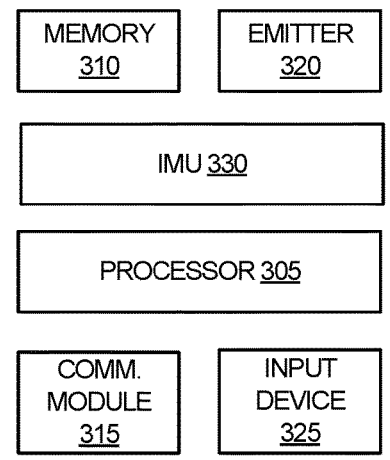
FIG. 2
FIG. 3

METHODS AND APPARATUS TO ALIGN COMPONENTS IN VIRTUAL REALITY ENVIRONMENTS

CROSS-REFERENCE TO RELATED APPLICATIONS

This application claims priority to U.S. Provisional Application No. 62/335,829, titled METHODS AND APPARATUS TO ALIGN COMPONENTS IN VIRTUAL REALITY ENVIRONMENTS and filed on May 13, 2016, the entire contents of which are hereby incorporated herein by reference.

TECHNICAL FIELD

This disclosure relates generally to virtual reality (VR) environments, and, more particularly, to methods and apparatus to align components in VR environments.

BACKGROUND

A virtual reality (VR) system generates an immersive virtual environment for a user. For example, the immersive environment can be three-dimensional (3D) and can include multiple virtual objects with which the user may interact. The user can experience the immersive virtual environment via various display devices such as, for example, a helmet or other head mounted device including a display, glasses, or goggles that a user looks through when viewing a display device.

Once immersed in the 3D virtual environment, the user can move through the virtual environment and move to other areas of the virtual environment, through physical movement and/or manipulation of an electronic device to interact with the virtual environment and personalize interaction with the virtual environment. For example, the VR system can include sensors to track the user's head or body movement. Additionally, the VR system can include a handheld device that includes sensors, and other such electronic components. The user can use this handheld device to navigate in and interact with the virtual environment.

SUMMARY

Some aspects perform a method that includes detecting a first input from a handheld controller of a virtual reality system, responsive to detecting the first input, instructing a user to orient a handheld controller in a designated direction, detecting a second input from the handheld controller; and responsive to detecting the second input, storing alignment data representative of an alignment of the handheld controller.

Some aspects include a computer program product including a nontransitory storage medium, the computer program product including code that, when executed by processing circuitry of a virtual reality system configured to produce a virtual reality environment, causes the processing circuitry to perform a method that includes detecting a first input from a handheld controller of the virtual reality system, responsive to detecting the first input: communicatively coupling the handheld controller to a head-mounted display of the virtual reality system and instructing a user to orient a handheld controller in a designated direction, detecting a second input from the handheld controller, and responsive to detecting the second input, storing alignment data representative of an alignment of the handheld controller.

Some aspects include an electronic apparatus configured to produce a virtual reality environment, the electronic apparatus including memory and controlling circuitry coupled to the memory, the controlling circuitry being configured to: detect a first input from a handheld controller of the virtual reality system, responsive to detecting the first input: communicatively couple the handheld controller to a head-mounted display of the virtual reality system via a wireless signal, and instruct a user to orient a handheld controller in a designated direction, detect a second input from the handheld controller, and responsive to detecting the second input: determine a controller orientation of the handheld controller, determine a display orientation of a head-mounted display; and store alignment data representative of an alignment of the handheld controller.

Some aspects perform a method that includes detecting an input from a handheld controller of a virtual reality system, communicatively coupling the handheld controller to a head-mounted display of the virtual reality system in response to the input, displaying in a virtual reality scene a first symbol associated with the handheld controller, and a second symbol associated with the head-mounted display in response to communicatively coupling the handheld controller to the head-mounted display, and storing data representative of alignment of the handheld controller to the head-mounted display when the first symbol at least partially overlaps with the second symbol in the virtual reality scene.

Some aspects perform a method that includes detecting an input from a handheld controller of a virtual reality system, communicatively coupling the handheld controller to a head-mounted display of the virtual reality system in response to the input, instructing a user to orient the head-mounted display in a designated direction while the input is detected, displaying in a virtual reality scene an indicator representing the orientation of the head-mounted display, and storing data representative of an alignment of the head-mounted display when the input is no longer detected.

According to one aspect a computer-readable medium has recorded and embodied thereon instructions that, when executed by a processor of a computer system, cause the computer system to perform any of the methods and processes disclosed herein.

The details of one or more implementations are set forth in the accompanying drawings and the description below. Other features will be apparent from the description and drawings, and from the claims.

BRIEF DESCRIPTION OF THE DRAWINGS

FIG. 2 is a schematic diagram that illustrates an example head-mounted display (HMD) in accordance with the teachings of this disclosure.

FIG. 3 is a schematic diagram that illustrates an example handheld controller in accordance with the teachings of this disclosure.

DETAILED DESCRIPTION

Figure 1:
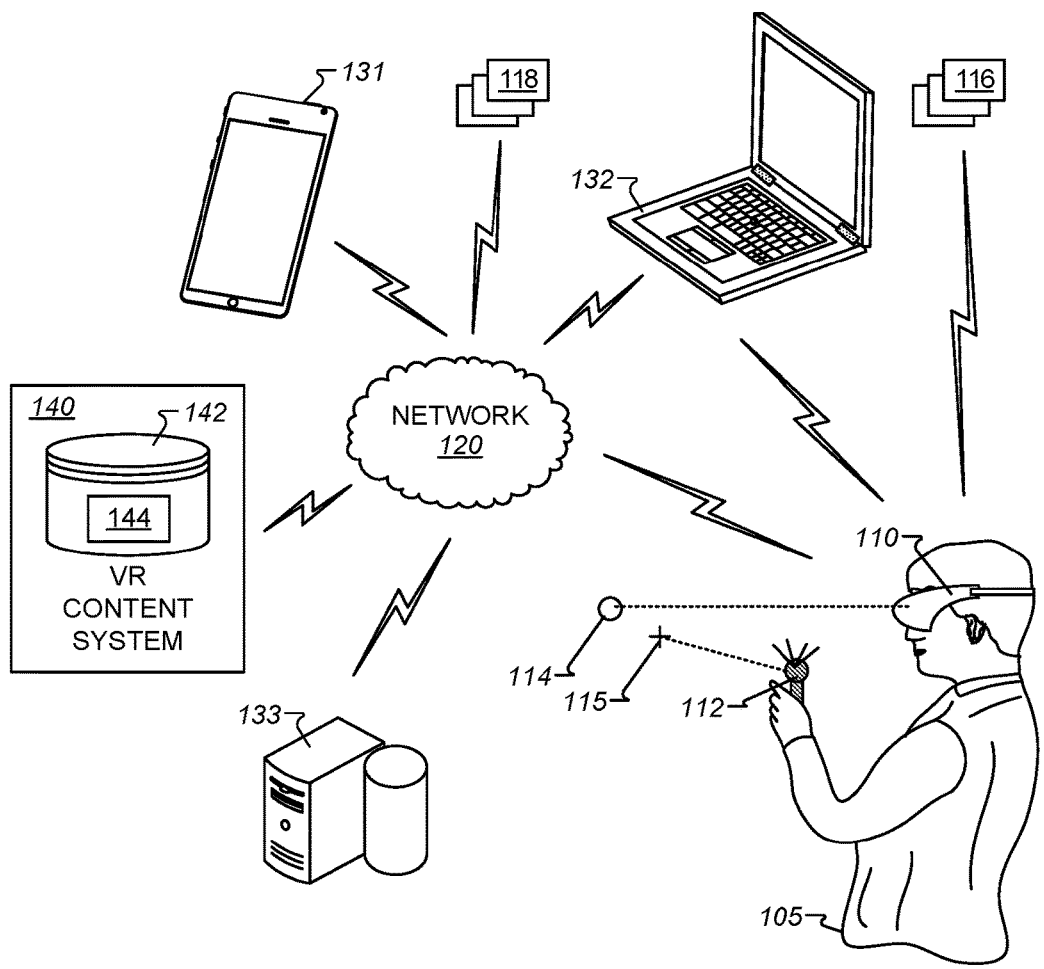
FIG. 1 is a block diagram of an example VR system that may be used to align components in VR environments in accordance with this disclosure.

Reference will now be made in detail to non-limiting examples of this disclosure, examples of which are illustrated in the accompanying drawings. The examples are described below by referring to the drawings, wherein like reference numerals refer to like elements. When like reference numerals are shown, corresponding description(s) are not repeated and the interested reader is referred to the previously discussed figure(s) for a description of the like element(s).

Turning to FIG. 1, a block diagram of an example virtual reality (VR) system 100 for creating and interacting with a three-dimensional (3D) VR environment in accordance with the teachings of this disclosure is shown. In general, the system 100 provides the 3D VR environment and VR content that enable a user to access, view, use and/or interact with the examples described herein. The system 100 can provide the user with options for accessing the content, applications, virtual objects, and VR controls using, for example, eye gaze and/or movements within the VR environment. The example VR system 100 of FIG. 1 includes a head-mounted display (HMD) 110 and a handheld controller 112. Also shown is a user 105 who is wearing the HMD 110 and holding the handheld controller 112.

Using the examples disclosed herein, the user 105 can align the HMD 110 and the controller 112 with each other. For example, the alignment can be performed during an initialization process or to correct for drifting apart between the HMD 110 and the controller 112 over time. By aligning the HMD 110 and the controller 112 with each other, the location at which a representation of the controller 112 in the VR environment within the HMD 110 is aligned with the position of the actual controller 112 relative to the HMD 110. Additionally, the alignment of one or both of the HMD 110 and the controller 112 can drift relative to a VR scene. Embodiments disclosed herein can be used to re-align one or both of the HMD 110 and the controller 112 to a VR scene.

In some embodiments, the HMD 110 and the controller 112 each measure movement and/or rotational changes independently (e.g., using separate inertial motion units). Using these measurement, the HMD 110 and controller 112 each independently track their own orientations and/or poses. In some embodiments, the pose includes a position and an orientation. For example, position can be represented by three degrees of freedom (3DOF) including forward/backward (X coordinate), right/left (Y coordinate), and up/down (Z coordinate) and orientation can include three rotational components such as pitch (i.e., rotation about the Y-axis), yaw (i.e., rotation about the Z-axis), and roll (i.e., rotation about the X-axis). Accordingly, in some embodiments, pose is represented by six degrees of freedom (6DOF), including forward/backward (X coordinate), right/left (Y coordinate), up/down (Z coordinate), pitch (i.e., rotation about the Y-axis), yaw (i.e., rotation about the Z-axis), and roll (i.e., rotation about the X axis). Although many of the example herein are described in terms of alignment of poses of the HMD 110 and the controller 112, other embodiments are possible as well. For example, some embodiments align one or the other of position or orientation of the HMD 110 and the controller 112. Embodiments of the technology described herein align the controller 112 and/or the HMD 110 with each other and/or with a VR scene.

Over time, as the HMD 110 and the controller 112 independently track their poses, numerical discrepancies can accumulate causing the alignment of the HMD 110 and the controller 112 to drift. For example, after time, the pose of the controller 112 relative to the HMD 110 in real space may be different than the pose of the virtual representation of the controller 112 relative to the virtual representation of the HMD 110 in the VR environment.

Thus, the user 105 may think they are pointing the controller 112 in a particular direction relative to looking in that direction (e.g., looking straight ahead with their eyes, and/or by pointing their HMD 110 straight ahead). However, in actuality, the user 105 may be looking and pointing in slightly different directions. This effect is referred to as drift, and may cause the user 105 to have some difficulty interacting with virtual objects in a VR environment. Accordingly, examples are disclosed herein that enable a user to easily align the HMD 110 to the controller 112 during, for example, VR application startup and/or later during operation. An alignment procedure adjusts the pose of the controller 112 in the HMD 110 to align with the pose of the HMD 110. In some examples, the alignment takes place together with the communicative coupling of the HMD 110 and controller 112 via, for example, a short-range wireless signal, such as Bluetooth®, Wi-Fi®, etc. In this way, a single actuation of an input device (e.g., pressing a button into an activated state) can be used to trigger communicative coupling and alignment of the HMD 110 and the controller 112. In some embodiments, the alignment procedure is also performed after the communicative coupling. For example, in some embodiments, the alignment procedure is performed multiple times during a VR session to perform an initial alignment and/or then, later, for re-alignment. While for simplicity, references are made herein to buttons and button presses, any other input devices may be used to trigger communicative coupling and alignment according to this disclosure. For example, a touch or gesture on a trackpad, etc. or any other detectable input.

An example alignment process includes detecting pressing of a button of a first component (e.g., the handheld controller 112), communicatively coupling the controller 112 to a second component (e.g., the HMD 110) in response to the button pressing, displaying in a VR scene a first symbol (e.g., a target 114) associated with the HMD 110, and a second symbol (e.g., a cursor 115) associated with the controller 112 in response to the communicative coupling. In some examples, the cursor 115 can be represented as a laser pointer or a ray associated with (or emitted from) the handheld controller. The user is instructed to orient the HMD and/or their eyes toward the first symbol, and the point the handheld controller 112 at the first symbol. And storing data representative of alignment (also can be referred to as alignment data) of the controller 112 to the HMD 110 when the target 114 and cursor 115 overlap in the VR scene. In some examples, the VR scene changes while the target 114 and the cursor 115 are displayed in the changing VR scene.

In some examples, the alignment data represents a correction in at least one component of pose of the controller 112 relative to the HMD 110. For example, when a user attempts to point both the controller 112 and the HMD 110 in a designated direction (e.g., straight forward, to the right, etc.); the controller 112 may be pointed in a different direction than the HMD 110. Accordingly, example alignment data represents an offset to be applied to one or more components of a 3DoF or a 6DoF reference model of the controller 112 that is maintained by the HMD 110 or another component of the system 100. Alignment data may be applied by adding the values of the alignment data to, for example, 3DoF or 6DoF coordinates such that a measured pose is changed to a corrected pose. For example, alignment data could represent a difference between the pose of an HMD and a handheld controller. Alignment data may similarly be applied between HMD pose and an origin or designated alignment point of a VR scene (see FIG. 9).

In some examples, the button may need to be pressed and held. In some instances, the roles of the controller 112 and the HMD 110 are reversed, e.g., a button is pressed on the HMD 110 rather than on the controller 112. Or, the buttons need to be pressed and held on both the handheld controller 112 and the HMD 110.

The pose (e.g., in 6DoF, or in 3DoF) of the HMD 110 may be determined using emitters or images (one of which is designated at reference numeral 116) that can be used to determine the pose of the HMD 110, and/or using sensors or cameras (one of which is designated at reference numeral 118) that can be used to determine the orientation of the HMD 110. The HMD 110 can include a camera 240 (see FIG. 2) that can be used to sense the emitters/images 116, and/or an emitter 245 (see FIG. 2) for sensing by the sensors/cameras 118. Any number and/or type(s) of emitters, images, sensors and/or cameras, and any method of using the same to determine the pose of the HMD 110 may be used. The pose of the handheld controller 112 can, likewise, be determined using the sensor/camera 118, and an emitter 320 (see FIG. 3) of the handheld controller 112. Determination of pose, including positions and/or orientation, may be performed by the HMD 110 or another device (e.g., any of devices 131-133 discussed below) of the VR system 100, and/or may be implemented by the example computing devices P00 and P50 of FIG. 12.

As shown in FIG. 1, the example VR system 100 includes any number of computing and/or electronic devices that can exchange data over a network 120. The devices may represent clients or servers, and can communicate via the network 120 or any other additional and/or alternative network(s). Example client devices include, but are not limited to, a mobile device 131 (e.g., a smartphone, a personal digital assistant, a portable media player, etc.), an electronic tablet (not shown), a laptop or netbook 132, a camera (not shown), the HMD 110, a desktop computer 133, the VR handheld controller 112, a gaming device (not shown), and any other electronic or computing devices that can communicate using the network 120 or other network(s) with other computing or electronic devices or systems, or that may be used to access VR content or operate within a VR environment. The devices 110, 112, and 131-133 may represent client or server devices. The devices 110, 112, and 131-133 can execute a client operating system, and one or more client applications that can access, render, provide, or display VR content on a display device included in or in conjunction with each respective device 110, 112, and 131-133.

In some examples, the mobile device 131 can be placed, located, or otherwise implemented or operated in conjunction within the HMD 110 to provide a display that can be used as the screen for the HMD 110. The mobile device 131 can additionally or alternatively include hardware and/or software for executing VR applications.

FIG. 2 is a schematic diagram of an example HMD 200 that may be used, among other things, to implement the example HMD 110 of FIG. 1. The example HMD 200 of FIG. 2 includes an optics module 205, a processor module 210, and a sensing module 215.

The optics module 205 includes, but is not limited to, lenses, mirrors, coatings, apertures, etc. that enable a wearer of the HMD 200 to view a display 220. The example display 220 displays side-by-side images and/or videos for respective eyes of a wearer of the HMD 200. In other examples, two (or more) of the display 220 are used to collectively display, respectively, the side-by-side images and/or videos.

To control the HMD 200, the example processor module 210 of FIG. 2 includes a processor 225 in the form of a microcontroller, a central processing unit (CPU) and/or a graphics processing unit (GPU) programmed or configured to execute machine-readable instructions stored in a memory 230. In some examples, the instructions, when executed, cause the processor 225 to, among other things, implement VR applications, determine the pose of the HMD 200 and/or the controller 112, and/or perform an alignment procedure to align the HMD 200 with the controller 112.

In some examples, alignment data and/or parameters are stored in the memory 230. In some embodiments, the alignment data represents a difference or offset between a first direction in which the HMD 200 is oriented, and a second direction in which a handheld controller is oriented during an alignment procedure in which it is assumed that the handheld controller is being held with the intention of being aligned with the HMD 200. For example, the alignment data can represent an offset between a longitudinal axis of the controller relative to a direction a front surface of the HMD 200 (e.g., a vector normal to the surface of the HMD 200). Thus, example alignment data could indicate that a user unintentionally points the controller 112 to the right by 1 degree and upward by 2 degrees when pointing the controller and looking at the same point in a VR scene. The HMD 200 or another device 131-133 executing a VR application can use the alignment data to correct the measured orientation of the handheld controller so that it is pointing leftward by 1 degree and downward by 2 degrees so the handheld controller is now more accurately pointing at what the user is looking at. In some examples, what a wearer is looking at is determined by the position of the HMD. In other examples, what a wearer is looking at is determined using eye tracking. The alignment data and/or parameters can also compensate for any drifting apart of a target of the HMD and a target of a handheld controller due to, for example, accumulating numerical discrepancies, mechanical changes over time, user fatigue, etc. In some embodiments, the alignment data includes data that can be used to align the poses of the controller and the HMD (e.g., offsets for both orientation and position).

In some embodiments, the alignment data represents a reference controller coordinate system for the controller and/or a reference HMD coordinate system. For example, the reference controller coordinate system may store an X-axis that is aligned with the longitudinal axis of the controller user is aiming the controller forward as instructed during the alignment procedure, while the reference HMD coordinate system may store an X-axis that is aligned with the direction in which the front surface of the HMD is facing when the user is facing forward as instructed during the alignment procedure.

To communicatively couple the example HMD 200 to a handheld controller, such as the controller 112 of FIG. 1, the example HMD 200 of FIG. 2 includes a communication module 235. An example communication module 235 is a short-range wireless communication module in accordance with the Bluetooth standard. However, other communication signals and/or protocols, such as Wi-Fi or universal serial bus (USB) may be used.

To help in the determination of the orientation of the HMD 200, the example sensing module 215 of FIG. 2 can include a forward-facing sensor or camera 240 that can be used to determine the orientation of the HMD 200 using the example emitters/images 116 of FIG. 1. Additionally or alternatively, the example sensing module 215 can include an emitter 245 that other devices of a VR system, such as the example devices 131-133, can use to determine the orientation of the HMD 200. Some embodiments include an inertial measurement unit (IMU) 260 that can be used to determine the orientation and/or detect motion of the HMD 200. In various embodiments, the IMU 260 includes various types of sensors such as, for example, an accelerometer, a gyroscope, a magnetometer, and other such sensors. A position and orientation of the HMD 200 may be detected and tracked based on data provided by the sensors included in the IMU 260. The detected position and orientation of the HMD 200 may allow the system to in turn, detect and track the user's head gaze direction and movement.

To determine the direction in which a wearer is gazing, the example processor module 210 includes an eye tracking module 250. Using any number and/or type(s) of algorithms, methods and logic, the of FIG. 2 processes images of one or more of the wearer's eyes to determine the direction in which the wearer is gazing.

To enable a user to control or operate the HMD 200, the example processor module 210 includes an input device 255. Example of the input device 255 include buttons and other user-actuatable controls. The example input device 255 of the HMD 200 can be operated by a user to initiate communicative coupling of the HMD 200 to a handheld controller (not shown) via the communication modules 235 and 315 (see FIG. 3), and to initiate alignment of the HMD 200 and the handheld controller.

The modules 205, 210 and 215, and the elements therein may be implemented using any number and/or type(s) of components and/or machine-readable instructions. In some examples, the processor module 210 is implemented using a mobile device such as a mobile phone or smartphone that can be communicatively and/or physically coupled to the HMD 200. The sensing module 215 The sensing module 215 may additionally be implemented by the mobile device.

FIG. 3 illustrates an example handheld controller 300 that may be used to implement the example handheld controller 112 of FIG. 1. To control the handheld controller 300 of FIG. 3, the example handheld controller 300 includes a processor 305 in, for example, the form of a CPU or a microcontroller programmed or configured to execute machine-readable instructions stored in a memory 310. In some examples, the instructions, when executed, cause the processor 305 to, among other things, interact with the HMDs 110, 200, and operate a communication module 315.

To communicatively couple the example handheld controller 300 to the HMDs 110, 200, the example handheld controller 300 of FIG. 3 includes the communication module 315. An example communication module 315 is a short-range wireless communication module in accordance with the Bluetooth standard. However, other communication signals and/or protocols, such as Wi-Fi, USB, etc. may be used.

To help in the determination of the location of the handheld controller 300, the example handheld controller 300 of FIG. 3 includes an emitter 320 that other devices of a VR system, such as the example device 110, 200 and 131-133, can use to determine the orientation of the handheld controller 300. In some examples, reflectors may be implemented to reflect light emitted by other devices to determine the orientation of the controller 300. Additionally or alternatively, some embodiments of the handheld controller 300 include an inertial measurement unit (IMU) 330 to track the orientation and/or motion of the handheld controller 300. The IMU 330 may be similar to the IMU 260 of the HMD 200.

To enable a user to control or operate the handheld controller 300, the example handheld controller 300 includes an input device 325 that can be actuated by a user. An example of the input device 325 is a button that the user can press to actuate. The example input device 325 of the handheld controller 300 can be operated by a user to initiate communicative coupling of the handheld controller 300 and an HMD via the communication modules 235 and 315, and to initiate alignment of the handheld controller 300 and the HMD.

To provide illumination for the sensor/camera 240, and/or others of the devices 131-133 that can determine the location of the handheld controller 300, the example handheld controller 300 includes an emitter 320. The emitter 320 may emit, for example, visible light and/or infrared light.

Figure 4:
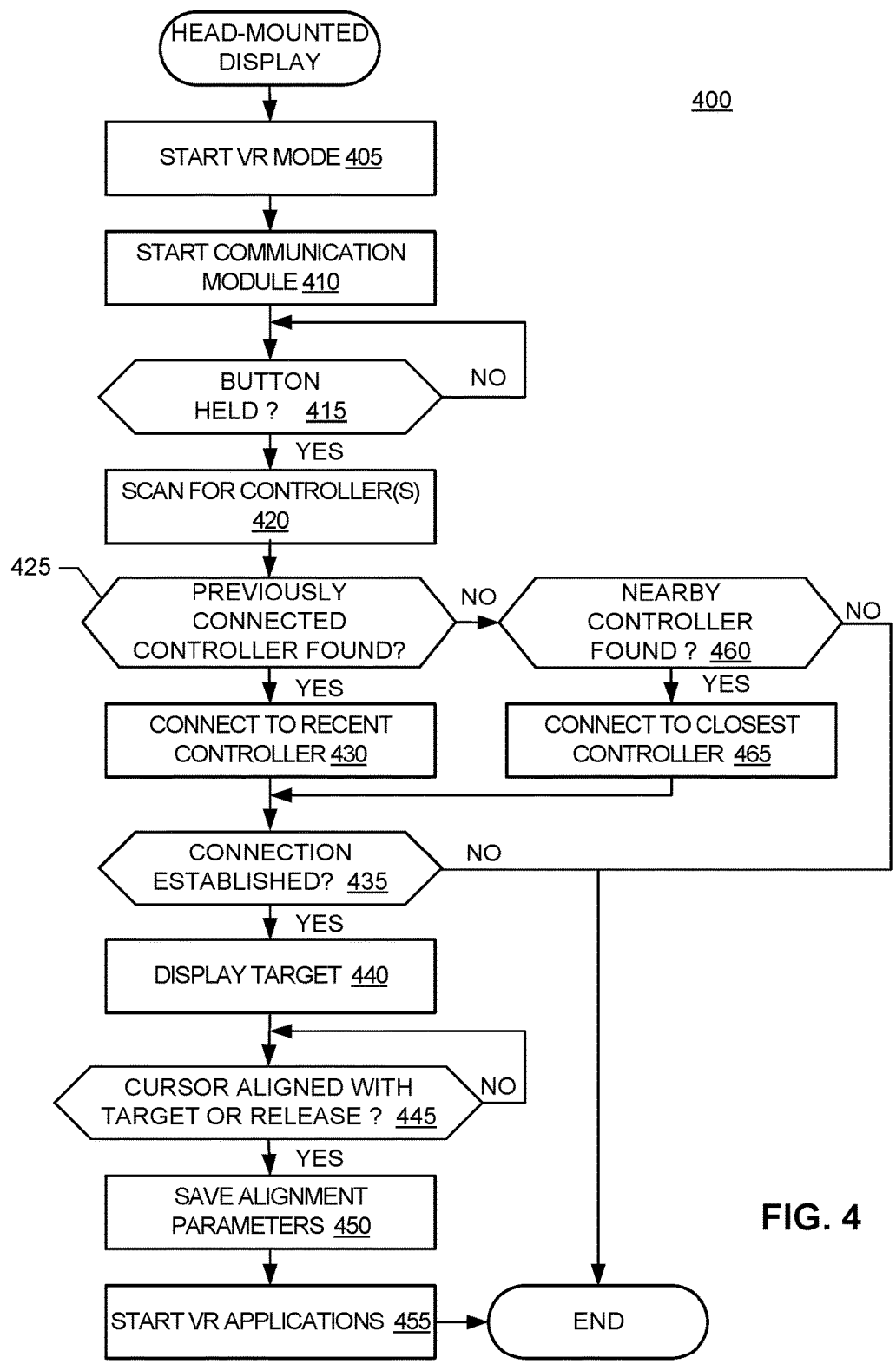
FIG. 4 is a flowchart representing an example method that may be used to implement an HMD.
Figure 12:
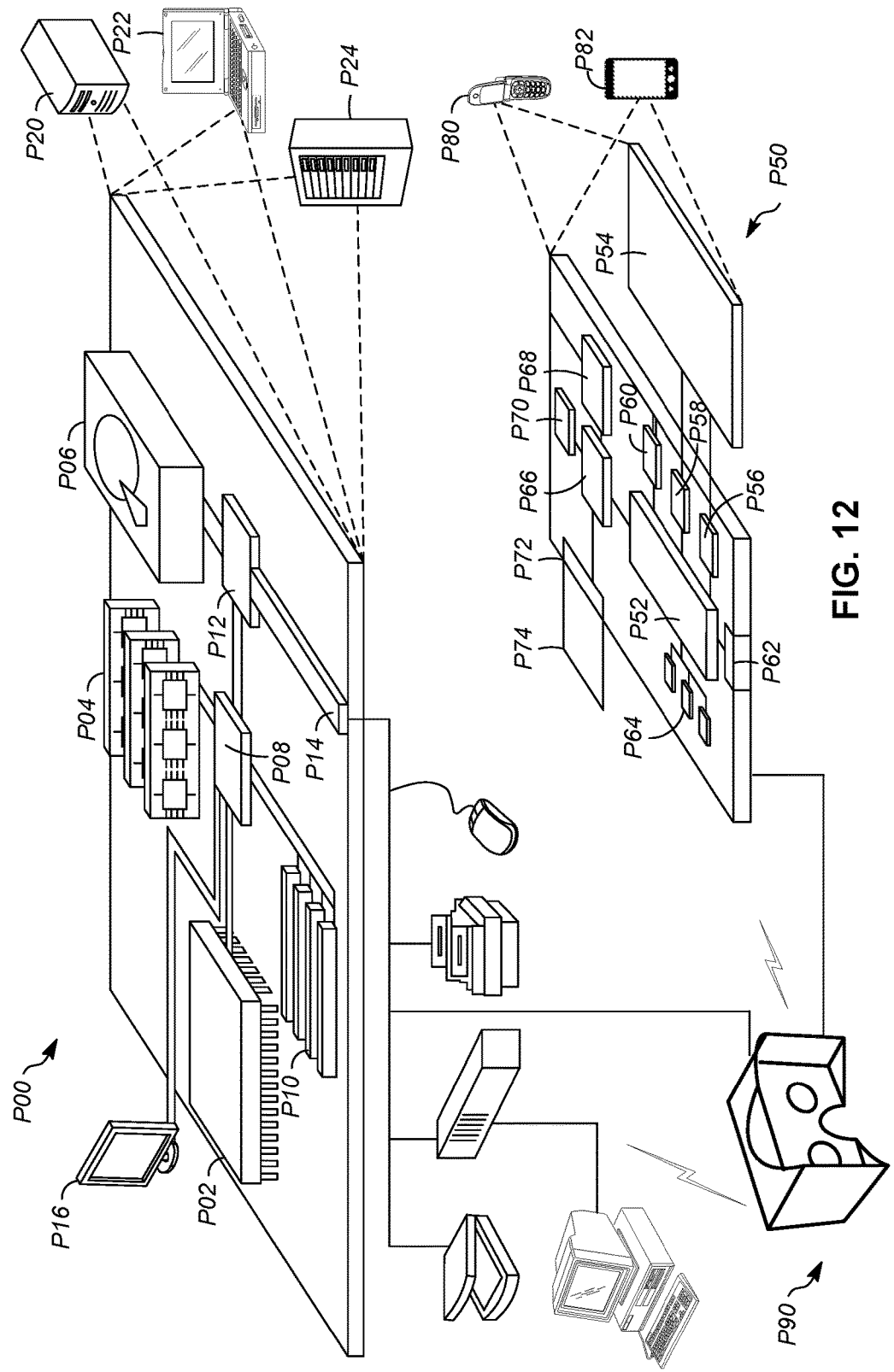
FIG. 12 is a block diagram of an example computer device and an example mobile computer device, which may be used to implement the examples disclosed herein.

FIG. 4 is a flowchart of an example process 400 that may, for example, be implemented as machine-readable instructions carried out by one or more processors, such as the example processors of FIG. 12, to implement the example HMDs disclosed herein. The example method 400 will be described with reference to the example HMD 200, but may be used to implement other HMDs. The example method 400 of FIG. 4 includes the processor 225 starting a VR mode on the HMD 200 (block 405), and starting the communication module 235 in, for example, a Bluetooth discovery mode (block 410).

If a user actuates an input device such as the input device 255 (e.g., by pressing and holding a button) (block 415), the communication module 235 scans for nearby handheld controllers (block 420). If a recently connected handheld controller is found (block 425), the communication module 235 attempts to connect with that handheld controller (block 430). In some examples, the input device 255 does not need to be actuated and, instead, the HMD 200, while in VR mode, remains in a listening mode actively listening for Bluetooth queries from handheld controllers.

If communication is successfully obtained (block 435), the processor 225 initiates display of a target 605 (see FIG. 6) in a portion 615 (see FIG. 6) of a larger VR scene 620 (see FIG. 7) on the display 220 (within an HMD), and indicates to the user to look at the target 605, so that the HMD and the controller are pointed in the same direction, and point the connected handheld controller at the target 605 (block 440). The VR portion 615 of the VR scene 620, the target 605, and the cursor 610 are displayed in the HMD. When a cursor 610 (see FIG. 6) under control of a handheld controller aligns with (e.g., overlaps) with the target 605, the input device 255 (if actuated) or the input device 325 (if actuated) is released to indicate that the target 605 and cursor 610 are aligned (block 445), the position and orientation of the HMD and handheld controller are saved as alignment parameters in, for instance, the memory 230 (block 450), and VR applications are started (block 455). In some examples, the alignment data represents a correction in at least one orientation component of the controller 112 relative to the HMD 110. For example, when the user indicates that both the controller and the HMD are pointed in the same direction, the controller 112 may actually be pointed in a different direction than the HMD 110. Accordingly, example alignment data can include data representing an offset to be applied to one or more components of the pose of the controller 112 or HMD 110 (e.g., in any of the components of a 3DoF or a 6DoF reference coordinate system). Alignment parameters may be determined, for example, using the emitters 320 and 245, the sensor/camera 240, and/or the eye tracking module 250. Control exits from the example method 400 until a new communicative coupling and/or alignment needs to be performed, which may be triggered by a user request, an expiration of a time period, an event occurring in the VR application, or any other type of event. Alignment data, such as alignment parameters, are applied subsequently when determining the position and/or orientation of the handheld controller, which may then be used to determine a target location (or object) at which the connected handheld controller is pointed. Due to application of the alignment data, the determined position and orientation can be more accurately determined. Thus, in some implementations, the target location (or object) is also determined more accurately based on application of the alignment data. In other words, the representation of the handheld controller in the VR environment can more accurately point at the user's intended target by using the alignment data to correct previous discrepancies or drifting in determining the orientation and position of the handheld controller.

Returning to block 435, if the connection is not able to be established, control exits from the example method 400 until a new attempt to communicatively couple and/or align the HMD to a handheld controller is initiated.

Returning to block 425, if a previously connected handheld controller is not found, the communication module 235 searches for nearby handheld controllers (block 460). If a nearby handheld controller is not found (block 460), control exits from the example method 400 until a new attempt to communicatively couple and/or align the HMD to a handheld controller is initiated. Otherwise, the communication module 235 attempts to connect with the closest handheld controller (block 465), and control proceeds to block 435.

Figure 7:
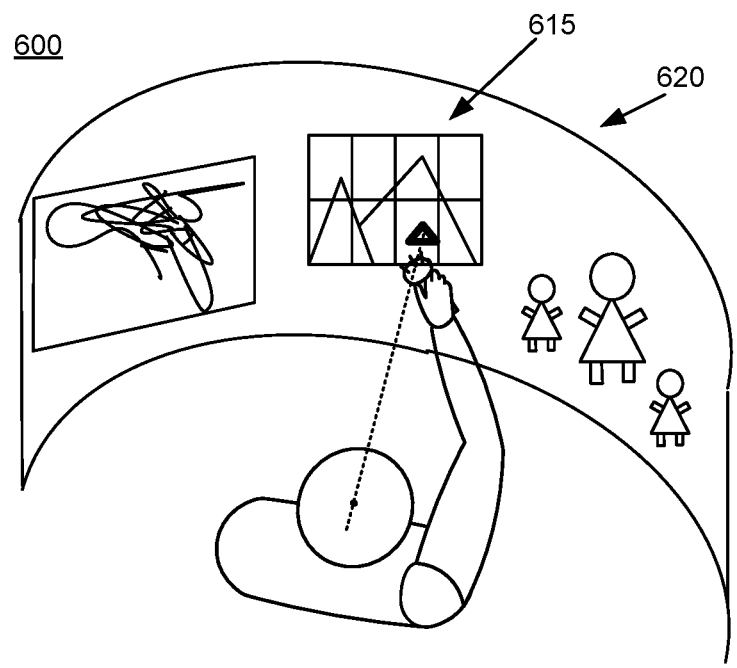
FIG. 7 is an example interaction showing an example VR scene showing an example target and an example cursor.
Figure 11:
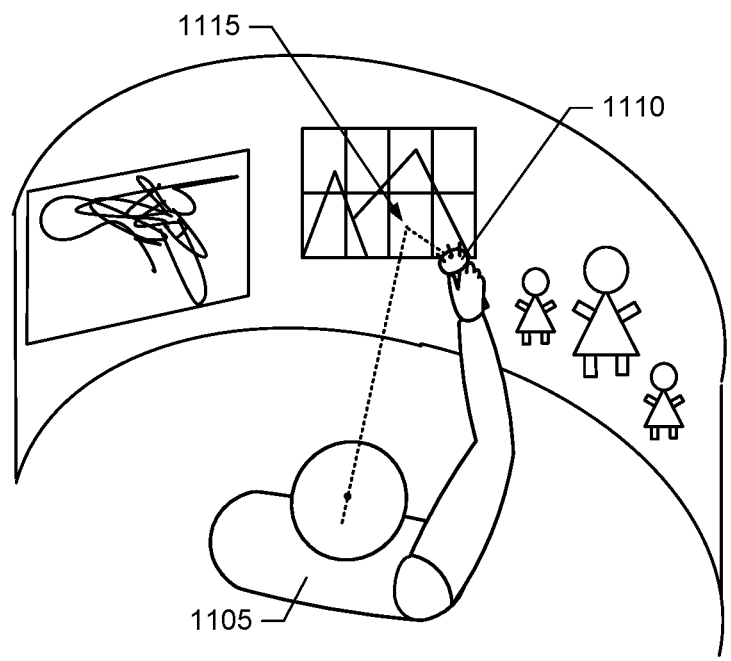
FIG. 11 is an example VR scene showing an example pointing of an HMD and a handheld controller.

FIG. 7 and, similarly, FIG. 11 are shown from the perspective of a 3$^{rd}$ person viewing a VR environment from within that VR environment. The person depicted in these figures is in this VR environment with the 3$^{rd}$ person, and is as seen by the 3$^{rd}$ person.

Figure 5:
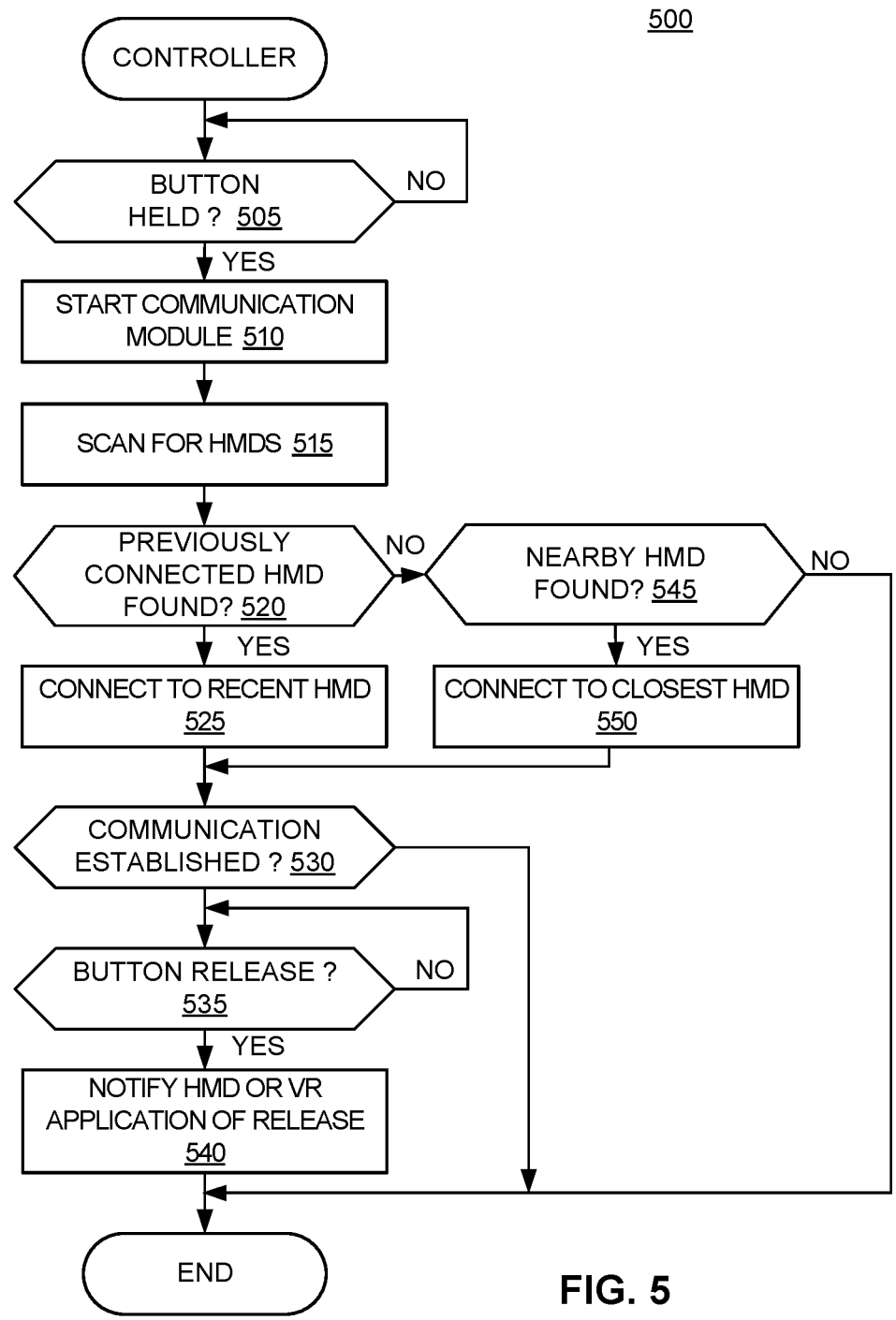
FIG. 5 is a flowchart representing an example method that may be used to implement a handheld controller.

FIG. 5 is a flowchart of an example process 500 that may, for example, be implemented as machine-readable instructions carried out by one or more processors, such as the example processors of FIG. 12, to implement the example handheld controllers disclosed herein. The example method 500 will be described with reference to the example handheld controller 300, but may be used to implement other handheld controllers. The example method 500 of FIG. 5 includes waiting for a user to actuate and hold the example input device 325 (block 505). When the input device 325 is actuated and held (block 505), the communication module 315 is activated in, for example, a Bluetooth discovery mode (block 510), and the communication module 315 scans for nearby HMDs (block 515). If a recently connected HMD is found (block 520), the communication module 315 attempts to connect with that HMD (block 525).

If a connection is established (block 530), the processor 305 waits for release of the actuated input device 325 (block 535). When determined that the input device 325 has been released (e.g., a button is released), the processor 305 notifies the HMD 110 or other VR application implementing the alignment (block 540), control exits from the method 500 until a new attempt to communicatively couple and/or align the controller to an HMD is initiated.

Returning to block 530, if the connection is not established (block 530), control exits from the example method 500 until a new attempt to communicatively couple and/or align the controller to an HMD is initiated.

Returning to block 520, if a previously connected HMD is not found, the communication module 315 searches for nearby HMDs (block 545). If a nearby HMD is not found (block 545), control exits from the example method 500 until a new attempt to communicatively couple and/or align the controller to an HMD is initiated. Otherwise, the controller attempts to connect with the closest HMD, and control proceeds to block 530.

Figure 6:
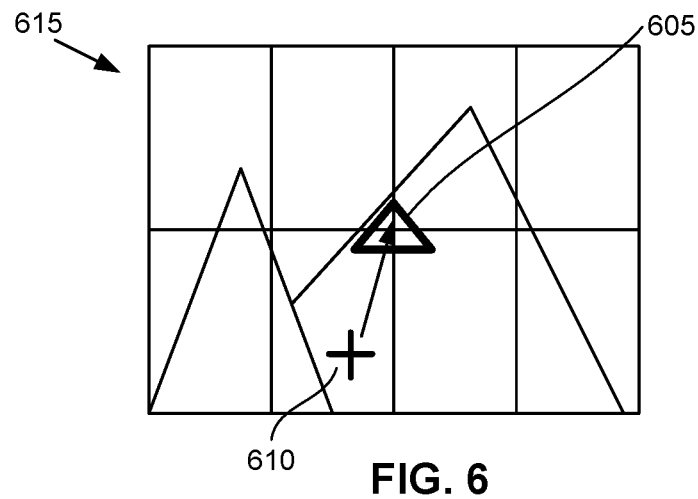
FIG. 6 is an example VR scene showing an example target and an example cursor.

Turning to FIG. 7, a VR scene 620 that includes the portion 615 of FIG. 6 is shown. As shown, the target 605 and the cursor 610 are overlaid on the VR scene 620 and, if a user moves their gaze or body, the target 605 and cursor 610 will be displayed on a different portion of the VR scene 600.

Figure 8A:
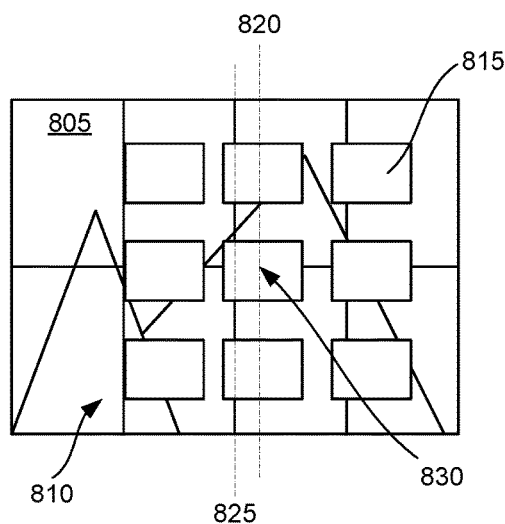
FIGS. 8A and 8B sequentially illustrate an example alignment of an HMD to a VR scene.
Figure 8B:
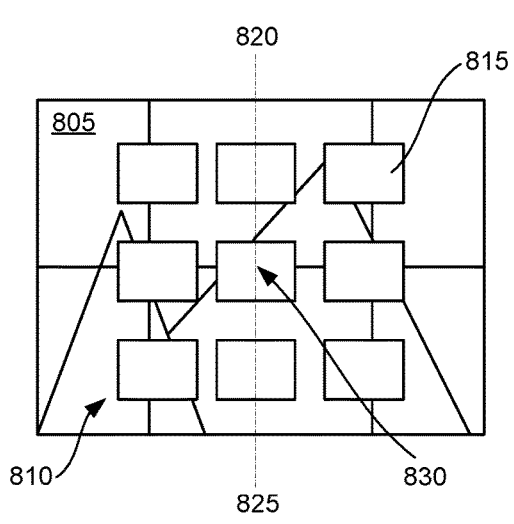

FIGS. 8A and 8B sequentially illustrate an example alignment of an HMD to a VR home screen (or other VR scene element, e.g., object). FIG. 8A illustrates an example VR scene 805 shown in an HMD, such as the HMD 110. The example VR scene 800 includes a home screen 810 comprising a plurality of buttons, one of which is designated at reference numeral 815. Because of drift, the centerline 820 of the home screen 810 is offset with respect to the centerline 825 of the VR scene 805, which is also the centerline of the HMD. To align the HMD to the home screen 810, a user may press and hold a button on the handheld controller. When instructed, the wearer of the HMD looks (e.g., with their eyes and/or by pointing their HMD) at the center 830 of the home screen 810 and releases the button. Based on the alignment data captured by the HMD, the home screen 810 is snapped back to the center of the VR scene (also HMD), as shown in FIG. 8B. In the example of FIGS. 8A and 8B, only a side-to-side offset is depicted for clarify of explanation. Other offsets may be corrected including ones, for example, in any of one or more coordinates of a 3DoF or 6DoF reference module. Such offsets may result in rotations, twists, etc.

Figure 9:
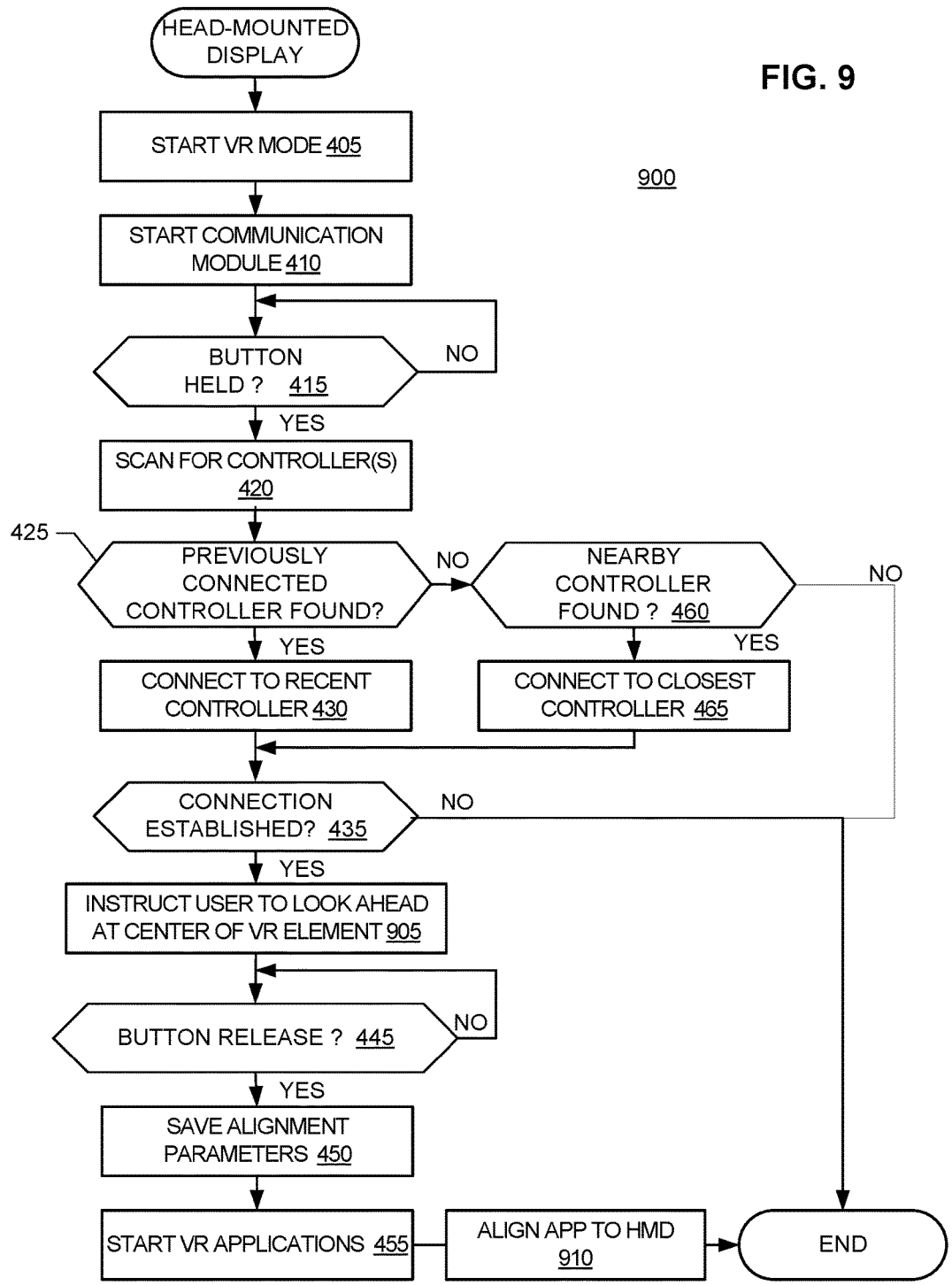
FIG. 9 is another flowchart representing an example method that may be used to implement an HMD.

FIG. 9 is a flowchart of an example process 900 that may, for example, be implemented as machine-readable instructions carried out by one or more processors, such as the example processors of FIG. 12, to implement the example HMDs disclosed herein. The example method 800 will be described with reference to the example HMD 200, but may be used to implement other HMDs. The example method of method 900 may be used to carry out the example alignment of an HMD and a VR scene as discussed above in connection with FIGS. 8A and 8B. Portions of the example method 900 are similar to the example method 400 of FIG. 4. Thus, descriptions of the identical portions of FIGS. 4 and 9 are not repeated here. Instead, interested readers are referred back to the descriptions of FIG. 4 for the identical portions.

At block 905, the user, while wearing the HMD 200, is instructed to look at the center of a VR element, such as a VR object, home screen, etc. and then stop actuating the input device 255 (e.g., by releasing a button). When it is determined that the input device 255 is no longer being actuated (block 445), alignment data representing an offset between the direction the HMD 110 was pointed and the location of the centerline of the VR element is recorded and stored (block 450). At block 455, VR application(s) are started and their position(s) are corrected using the stored alignment data. For example, as shown in FIGS. 8A and 8B, a home screen consisting of a set of buttons is shifted leftward to align with the center of the VR screen as defined by the alignment of the HMD 200 (block 910). Control then exits from the example method 800.

Figure 10:
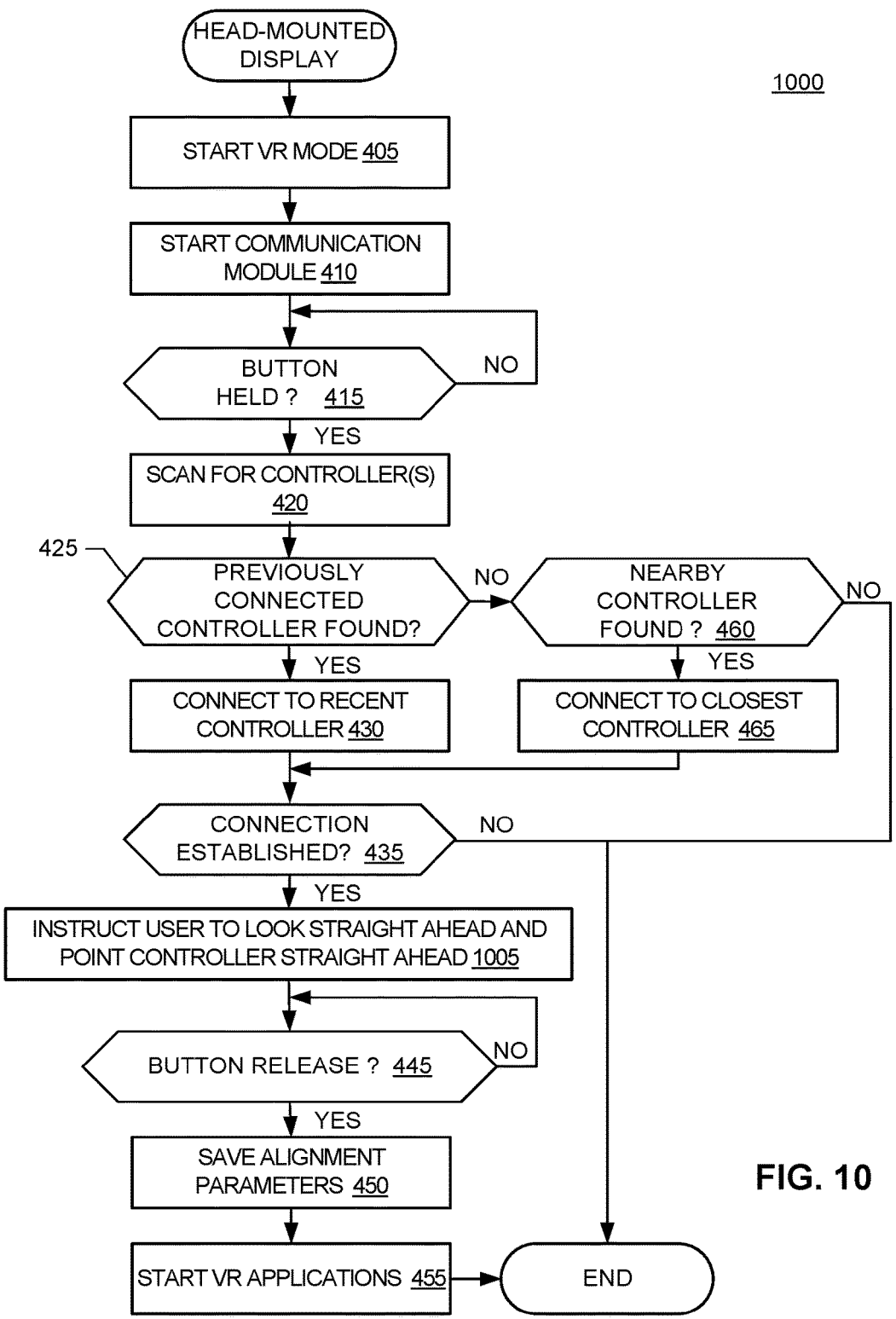
FIG. 10 is still another flowchart representing an example method that may be used to implement an HMD.

FIG. 10 is a flowchart of an example process 1000 that may, for example, be implemented as machine-readable instructions carried out by one or more processors, such as the example processors of FIG. 12, to implement the example HMDs disclosed herein. The example method 1000 will be described with reference to the example HMD 200, but may be used to implement other HMDs. The example method of method 1000 may be used to align a handheld controller to an HMD. Portions of the example method 1000 are similar to the example method 400 of FIG. 4. Thus, descriptions of the identical portions of FIGS. 4 and 10 are not repeated here. Instead, interested readers are referred back to the descriptions of FIG. 4 for the identical portions.

At block 1005, the user 1105 (see FIG. 11) is instructed to look in a designated direction (e.g., straight ahead, to the right, etc.) and simultaneously point the controller 1110 in that direction at the same location 1115 (see FIG. 11), and then stop actuating the input device 255 (e.g., by releasing a depressed button). When it is determined that the input device 255 is no longer being actuated (block 445), alignment data representing an offset between the pose of the HMD 200 and the pose of the handheld controller is stored (block 450). In some embodiments, the alignment data represents an offset between the orientation of the HMD 200 and the orientation of the handheld controller. At block 455, VR application(s) are started and the pose of the controller relative to the HMD 110 is changed based on the alignment data, so they are aligned with each other.

The examples of FIGS. 8A, 8B, 9, and 10 may be combined to simultaneously align an HMD to a VR element (e.g., home screen), and to align a handheld controller to the HMD. In such an example, the user would be instructed to look toward and point toward the center of a VR element.

In FIGS. 4, 9, and 10, the alignment parameters are shown as being saved after the button is released. However, in some examples, the alignment parameters can be stored, possibly temporarily, as the HMD is waiting for the button to be released.

One or more of the elements and interfaces disclosed herein may be duplicated, implemented in the parallel, implemented in the singular, combined, divided, re-arranged, omitted, eliminated, and/or implemented in any other way. Further, any of the disclosed elements and interfaces may be implemented by the example processor platforms P00 and P50 of FIG. 12, and/or one or more circuit(s), programmable processor(s), fuses, application-specific integrated circuit(s) (ASIC(s)), programmable logic device(s) (PLD(s)), field-programmable logic device(s) (FPLD(s)), and/or field-programmable gate array(s) (FPGA(s)), etc. Any of the elements and interfaces disclosed herein may, for example, be implemented as machine-readable instructions carried out by one or more processors. A processor, a controller and/or any other suitable processing device such as those shown in FIG. 12 may be used, configured, and/or programmed to execute and/or carry out the examples disclosed herein. For example, any of these interfaces and elements may be embodied in program code and/or machine-readable instructions stored on a tangible and/or non-transitory computer-readable medium accessible by a processor, a computer and/or other machine having a processor, such as that discussed below in connection with FIG. 12. Machine-readable instructions comprise, for example, instructions that cause a processor, a computer and/or a machine having a processor to perform one or more particular processes. The order of execution of methods may be changed, and/or one or more of the blocks and/or interactions described may be changed, eliminated, sub-divided, or combined. Additionally, they may be carried out sequentially and/or carried out in parallel by, for example, separate processing threads, processors, devices, discrete logic, circuits, etc.

The example methods disclosed herein may, for example, be implemented as machine-readable instructions carried out by one or more processors. A processor, a controller and/or any other suitable processing device such as that shown in FIG. 12 may be used, configured and/or programmed to execute and/or carry out the example methods. For example, they may be embodied in program code and/or machine-readable instructions stored on a tangible and/or non-transitory computer-readable medium accessible by a processor, a computer and/or other machine having a processor, such as that discussed below in connection with FIG. 12. Machine-readable instructions comprise, for example, instructions that cause a processor, a computer, and/or a machine having a processor to perform one or more particular processes. Many other methods of implementing the example methods may be employed. For example, the order of execution may be changed, and/or one or more of the blocks and/or interactions described may be changed, eliminated, sub-divided, or combined. Additionally, any or the entire example methods may be carried out sequentially and/or carried out in parallel by, for example, separate processing threads, processors, devices, discrete logic, circuits, etc.

As used herein, the terms "computer-readable medium" and "machine-readable medium" are expressly defined to include any type of readable medium and to expressly exclude propagating signals. Example computer-readable medium and machine-readable medium include, but are not limited to, one or any combination of a volatile and/or non-volatile memory, a volatile and/or non-volatile memory device, a compact disc (CD), a digital versatile disc (DVD), a read-only memory (ROM), a random-access memory (RAM), a programmable ROM (PROM), an electronically-programmable ROM (EPROM), an electronically-erasable PROM (EEPROM), an optical storage disk, an optical storage device, a magnetic storage disk, a magnetic storage device, a cache, and/or any other storage media in which information is stored for any duration (e.g., for extended time periods, permanently, brief instances, for temporarily buffering, and/or for caching of the information) and that can be accessed by a processor, a computer and/or other machine having a processor.

Returning to FIG. 1, the VR system 100 may include any number of VR content systems 140 storing content and/or VR software modules (e.g., in the form of VR applications 144) that can generate, modify, and/or execute VR scenes. In some examples, the devices 110, 112, and 131-133 and the VR content system 140 include one or more processors and one or more memory devices, which can execute a client operating system and one or more client applications. The HMD 110, the controller 112, the other devices 131-133 or the VR content system 140 may be implemented by the example computing devices P00 and P50 of FIG. 12.

The VR applications 144 can be configured to execute on any or all of the devices 110, 112, and 131-133. The HMD 110 can be connected to devices 131-133 to access VR content on VR content system 140, for example. Device 131-133 can be connected (wired or wirelessly) to HMD 110, which can provide VR content for display. A VR system can be HMD 110 alone, or a combination of device 131-133 and HMD 110.

The HMD 110 may represent a VR HMD, glasses, an eyepiece, or any other wearable device capable of displaying VR content. In operation, the HMD 110 can execute a VR application 144 that can playback received, rendered and/or processed images for a user. In some instances, the VR application 144 can be hosted by one or more of the devices 131-133.

In some implementations, one or more content servers (e.g., VR content system 140) and one or more computer-readable storage devices can communicate with the computing devices 110 and 131-134 using the network 120 to provide VR content to the devices 110 and 131-134.

In some implementations, the mobile device 131 can execute the VR application 144 and provide the content for the VR environment. In some implementations, the laptop computing device 132 can execute the VR application 144 and can provide content from one or more content servers (e.g., VR content server 140). The one or more content servers and one or more computer-readable storage devices can communicate with the mobile device 131 and/or laptop computing device 132 using the network 120 to provide content for display in HMD 106.

In the event that the HMD 106 is wirelessly coupled to device 102 or device 104, the coupling may include use of any wireless communication protocol. A non-exhaustive list of wireless communication protocols that may be used individually or in combination includes, but is not limited to, the Institute of Electrical and Electronics Engineers (IEEE®) family of 802.x standards a.k.a. Wi-Fi or wireless local area network (WLAN), Bluetooth, Transmission Control Protocol/Internet Protocol (TCP/IP), a satellite data network, a cellular data network, a Wi-Fi hotspot, the Internet, and a wireless wide area network (WWAN).

In the event that the HMD 106 is electrically coupled to device 102 or 104, a cable with an appropriate connector on either end for plugging into device 102 or 104 can be used. A non-exhaustive list of wired communication protocols that may be used individually or in combination includes, but is not limited to, IEEE 802.3x (Ethernet), a powerline network, the Internet, a coaxial cable data network, a fiber optic data network, a broadband or a dialup modem over a telephone network, a private communications network (e.g., a private local area network (LAN), a leased line, etc.).

A cable can include a Universal Serial Bus (USB) connector on both ends. The USB connectors can be the same USB type connector or the USB connectors can each be a different type of USB connector. The various types of USB connectors can include, but are not limited to, USB A-type connectors, USB B-type connectors, micro-USB A connectors, micro-USB B connectors, micro-USB AB connectors, USB five pin Mini-b connectors, USB four pin Mini-b connectors, USB 3.0 A-type connectors, USB 3.0 B-type connectors, USB 3.0 Micro B connectors, and USB C-type connectors. Similarly, the electrical coupling can include a cable with an appropriate connector on either end for plugging into the HMD 106 and device 102 or device 104. For example, the cable can include a USB connector on both ends. The USB connectors can be the same USB type connector or the USB connectors can each be a different type of USB connector. Either end of a cable used to couple device 102 or 104 to HMD 106 may be fixedly connected to device 102 or 104 and/or HMD 106.

FIG. 12 shows an example of a generic computer device P00 and a generic mobile computer device P50, which may be used with the techniques described here. Computing device P00 is intended to represent various forms of digital computers, such as laptops, desktops, tablets, workstations, personal digital assistants, televisions, servers, blade servers, mainframes, and other appropriate computing devices. Computing device P50 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device P00 includes a processor P02, memory P04, a storage device P06, a high-speed interface P08 connecting to memory P04 and high-speed expansion ports P10, and a low speed interface P12 connecting to low speed bus P14 and storage device P06. The processor P02 can be a semiconductor-based processor. The memory P04 can be a semiconductor-based memory. Each of the components P02, P04, P06, P08, P10, and P12, are interconnected using various busses, and may be mounted on a common motherboard or in other manners as appropriate. The processor P02 can process instructions for execution within the computing device P00, including instructions stored in the memory P04 or on the storage device P06 to display graphical information for a GUI on an external input/output device, such as display P16 coupled to high speed interface P08. In other implementations, multiple processors and/or multiple buses may be used, as appropriate, along with multiple memories and types of memory. Also, multiple computing devices P00 may be connected, with each device providing portions of the necessary operations (e.g., as a server bank, a group of blade servers, or a multi-processor system).

The memory P04 stores information within the computing device P00. In one implementation, the memory P04 is a volatile memory unit or units. In another implementation, the memory P04 is a non-volatile memory unit or units. The memory P04 may also be another form of computer-readable medium, such as a magnetic or optical disk.

The storage device P06 is capable of providing mass storage for the computing device P00. In one implementation, the storage device P06 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory P04, the storage device P06, or memory on processor P02.

The high speed controller P08 manages bandwidth-intensive operations for the computing device P00, while the low speed controller P12 manages lower bandwidth-intensive operations. Such allocation of functions is exemplary only. In one implementation, the high-speed controller P08 is coupled to memory P04, display P16 (e.g., through a graphics processor or accelerator), and to high-speed expansion ports P10, which may accept various expansion cards (not shown). In the implementation, low-speed controller P12 is coupled to storage device P06 and low-speed expansion port P14. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device P00 may be implemented in a number of different forms, as shown in the figure. For example, it may be implemented as a standard server P20, or multiple times in a group of such servers. It may also be implemented as part of a rack server system P24. In addition, it may be implemented in a personal computer such as a laptop computer P22. Alternatively, components from computing device P00 may be combined with other components in a mobile device (not shown), such as device P50. Each of such devices may contain one or more of computing device P00, P50, and an entire system may be made up of multiple computing devices P00, P50 communicating with each other.

Computing device P50 includes a processor P52, memory P64, an input/output device such as a display P54, a communication interface P66, and a transceiver P68, among other components. The device P50 may also be provided with a storage device, such as a microdrive or other device, to provide additional storage. Each of the components P50, P52, P64, P54, P66, and P68, are interconnected using various buses, and several of the components may be mounted on a common motherboard or in other manners as appropriate.

The processor P52 can execute instructions within the computing device P50, including instructions stored in the memory P64. The processor may be implemented as a chipset of chips that include separate and multiple analog and digital processors. The processor may provide, for example, for coordination of the other components of the device P50, such as control of user interfaces, applications run by device P50, and wireless communication by device P50.

Processor P52 may communicate with a user through control interface P58 and display interface P56 coupled to a display P54. The display P54 may be, for example, a TFT LCD (Thin-Film-Transistor Liquid Crystal Display) or an OLED (Organic Light Emitting Diode) display, or other appropriate display technology. The display interface P56 may comprise appropriate circuitry for driving the display P54 to present graphical and other information to a user. The control interface P58 may receive commands from a user and convert them for submission to the processor P52. In addition, an external interface P62 may be provided in communication with processor P52, so as to enable near area communication of device P50 with other devices. External interface P62 may provide, for example, for wired communication in some implementations, or for wireless communication in other implementations, and multiple interfaces may also be used.

The memory P64 stores information within the computing device P50. The memory P64 can be implemented as one or more of a computer-readable medium or media, a volatile memory unit or units, or a non-volatile memory unit or units. Expansion memory P74 may also be provided and connected to device P50 through expansion interface P72, which may include, for example, a SIMM (Single In Line Memory Module) card interface. Such expansion memory P74 may provide extra storage space for device P50, or may also store applications or other information for device P50. Specifically, expansion memory P74 may include instructions to carry out or supplement the processes described above, and may include secure information also. Thus, for example, expansion memory P74 may be provide as a security module for device P50, and may be programmed with instructions that permit secure use of device P50. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory P64, expansion memory P74, or memory on processor P52 that may be received, for example, over transceiver P68 or external interface P62.

Device P50 may communicate wirelessly through communication interface P66, which may include digital signal processing circuitry where necessary. Communication interface P66 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver P68. In addition, short-range communication may occur, such as using a Bluetooth, Wi-Fi, or other such transceiver (not shown). In addition, GPS (Global Positioning System) receiver module P70 may provide additional navigation- and location-related wireless data to device P50, which may be used as appropriate by applications running on device P50.

Device P50 may also communicate audibly using audio codec P60, which may receive spoken information from a user and convert it to usable digital information. Audio codec P60 may likewise generate audible sound for a user, such as through a speaker, e.g., in a handset of device P50. Such sound may include sound from voice telephone calls, may include recorded sound (e.g., voice messages, music files, etc.) and may also include sound generated by applications operating on device P50.

The computing device P50 may be implemented in a number of different forms, as shown in the figure. For example, it may be implemented as a cellular telephone P80. It may also be implemented as part of a smart phone P82, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the computing devices depicted in FIG. 12 can include sensors that interface with a virtual reality (VR headset/HMD device P90) to generate an immersive environment. For example, one or more sensors included on a computing device P50 or other computing device depicted in FIG. 12, can provide input to VR headset P90 or in general, provide input to a VR space. The sensors can include, but are not limited to, a touchscreen, accelerometers, gyroscopes, pressure sensors, biometric sensors, temperature sensors, humidity sensors, and ambient light sensors. The computing device P50 can use the sensors to determine an absolute position and/or a detected rotation of the computing device in the VR space that can then be used as input to the VR space (e.g., to perform alignments as described herein or to interact with the VR space after the alignment has been performed). For example, the computing device P50 may be incorporated into the VR space as a virtual object, such as a controller, a laser pointer, a keyboard, a weapon, etc. Positioning of the computing device/virtual object by the user when incorporated into the VR space can allow the user to position the computing device so as to view the virtual object in certain manners in the VR space. For example, if the virtual object represents a laser pointer, the user can manipulate the computing device as if it were an actual laser pointer. The user can move the computing device left and right, up and down, in a circle, etc., and use the device in a similar fashion to using a laser pointer.

In some implementations, one or more input devices included on, or connected to, the computing device P50 can be used as input to the VR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device P50 when the computing device is incorporated into the VR space can cause a particular action to occur in the VR space.

In some implementations, a touchscreen of the computing device P50 can be rendered as a touchpad in VR space. A user can interact with the touchscreen of the computing device P50. The interactions are rendered, in VR headset P90 for example, as movements on the rendered touchpad in the VR space. The rendered movements can control virtual objects in the VR space.

In some implementations, one or more output devices included on the computing device P50 can provide output and/or feedback to a user of the VR headset P90 in the VR space. The output and feedback can be visual, tactical, or audio. The output and/or feedback can include, but is not limited to, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some implementations, the computing device P50 may appear as another object in a computer-generated, 3D environment. Interactions by the user with the computing device P50 (e.g., rotating, shaking, touching a touchscreen, swiping a finger across a touch screen) can be interpreted as interactions with the object in the VR space. In the example of the laser pointer in a VR space, the computing device P50 appears as a virtual laser pointer in the computer-generated, 3D environment. As the user manipulates the computing device P50, the user in the VR space sees movement of the laser pointer. The user receives feedback from interactions with the computing device P50 in the VR environment on the computing device P50 or on the VR headset P90. The alignment techniques described herein may allow these interactions to feel more natural and intuitive to a user because the position of the corresponding object being rendered in the VR headset P90 will be aligned with the actual object.

In some implementations, a computing device P50 may include a touchscreen. For example, a user can interact with the touchscreen in a particular manner that can mimic what happens on the touchscreen with what happens in the VR space. For example, a user may use a pinching-type motion to zoom content displayed on the touchscreen. This pinching-type motion on the touchscreen can cause information provided in the VR space to be zoomed. In another example, the computing device may be rendered as a virtual book in a computer-generated, 3D environment. In the VR space, the pages of the book can be displayed in the VR space and the swiping of a finger of the user across the touchscreen can be interpreted as turning/flipping a page of the virtual book. As each page is turned/flipped, in addition to seeing the page contents change, the user may be provided with audio feedback, such as the sound of the turning of a page in a book.

In some implementations, one or more input devices in addition to the computing device (e.g., a mouse, a keyboard) can be rendered in a computer-generated, 3D environment. The rendered input devices (e.g., the rendered mouse, the rendered keyboard) can be used as rendered in the VR space to control objects in the VR space.

In this specification and the appended claims, the singular forms "a," "an," and "the" do not exclude the plural reference unless the context clearly dictates otherwise. Further, conjunctions such as "and," "or," and "and/or" are inclusive unless the context clearly dictates otherwise. For example, "A and/or B" includes A alone, B alone, and A with B. Further, connecting lines or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the embodiments disclosed herein unless the element is specifically described as "essential" or "critical."

Further implementations are summarized in the following examples:

Example 1

A method comprising: detecting a first input from a handheld controller of a virtual reality system; responsive to detecting the first input, instructing a user to orient a handheld controller in a designated direction; detecting a second input from the handheld controller; and responsive to detecting the second input, storing alignment data representative of an alignment of the handheld controller.

Example 2

The method of example 1, further comprising: responsive to detecting the first input, communicatively coupling the handheld controller to a head-mounted display of the virtual reality system.

Example 3

The method of example 2 further comprising: responsive to detecting the second input: determining a controller orientation of the handheld controller; and determining a display orientation of a head-mounted display (HMD).

Example 4

The method of example 3, wherein storing alignment data comprises storing data representative of an offset between the determined controller orientation and the determined display orientation.

Example 5

The method of example 2, wherein communicatively coupling comprises establishing a connection via a short-range wireless signal.

Example 6

The method of one of examples 1 to 5, further comprising aligning at least a portion of a virtual reality scene displayed by the head-mounted display based on the alignment data.

Example 7

The method of one of examples 1 to 6, wherein storing alignment data representative of the alignment of the handheld controller comprises storing at least one of a forward/back position, an up/down position, a left/right position, a pitch, a roll, and a yaw.

Example 8

The method of one of examples 1 to 7, wherein detecting the first input comprises detecting an actuation of an input device of the handheld controller.

Example 9

The method of example 8, wherein detecting the actuation of the input device comprises detecting a press of a button of the handheld controller.

Example 10

The method of example 8 or 9, wherein detecting the second input comprises detecting a release of an input device of the handheld controller.

Example 11

The method of example 10, wherein detecting the release of an input device comprised detecting the release of a button.

Example 12

A computer program product comprising a non-transitory storage medium, the computer program product including code that, when executed by processing circuitry of a virtual reality system configured to produce a virtual reality environment, causes the processing circuitry to perform a method, the method comprising: detecting a first input from a handheld controller of the virtual reality system; responsive to detecting the first input: communicatively coupling the handheld controller to a head-mounted display of the virtual reality system; and instructing a user to orient a handheld controller in a designated direction; detecting a second input from the handheld controller; and responsive to detecting the second input, storing alignment data representative of an alignment of the handheld controller.

Example 13

The computer program product of example 12, wherein the method further comprises: responsive to detecting the second input: determining a controller orientation of the handheld controller; and determining a display orientation of a head-mounted display (HMD).

Example 14

The computer program product of example 13, wherein storing alignment data comprises storing data representative of an offset between the determined controller orientation and the determined display orientation.

Example 15

The computer program product of one of examples 12 to 14, wherein communicatively coupling comprises establishing a connection via a short-range wireless signal.

Example 16

The computer program product of one of examples 12 to 15, further comprising aligning at least a portion of a virtual reality scene displayed by the head-mounted display based on the alignment data.

Example 17

The computer program product of one of examples 12 to 16, wherein instructing a user to orient a handheld controller in a designated direction comprises displaying instructions within a virtual reality scene displayed by the head-mounted display.

Example 18

An electronic apparatus configured to produce a virtual reality environment, the electronic apparatus comprising: a memory; and controlling circuitry coupled to the memory, the controlling circuitry being configured to: detect a first input from a handheld controller of the virtual reality system; responsive to detecting the first input: communicatively couple the handheld controller to a head-mounted display of the virtual reality system via a wireless signal; and instruct a user to orient a handheld controller in a designated direction; detect a second input from the handheld controller; and responsive to detecting the second input: determine a controller orientation of the handheld controller; determine a display orientation of a head-mounted display; and store alignment data representative of an alignment of the handheld controller.

Example 19

The electronic apparatus of example 18, wherein storing alignment data comprises storing data representative of an offset between the determined controller orientation and the determined display orientation.

Example 20

The electronic apparatus of example 19, the controlling circuitry being further configured to coordinate movement of the handheld controller and the head-mounted display in a virtual reality scene based on the stored alignment data.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A method comprising:
   detecting a first input from a handheld controller of a virtual reality system;
   responsive to detecting the first input:
      communicatively coupling the handheld controller to a head-mounted display of the virtual reality system; and
      instructing a user to orient a handheld controller in a designated direction;
   detecting a second input from the handheld controller; and
   responsive to detecting the second input:
      determining a controller orientation of the handheld controller;
      determining a display orientation of the head-mounted display; and
      storing alignment data representative of an alignment of the handheld controller, the alignment data including data representative of an offset between the determined controller orientation and the determined display orientation.

2. The method of claim 1, wherein communicatively coupling comprises establishing a connection via a short-range wireless signal.

3. The method of claim 1, further comprising aligning at least a portion of a virtual reality scene displayed by the head-mounted display based on the alignment data.

4. The method of claim 1, wherein storing alignment data representative of the alignment of the handheld controller comprises storing at least one of a forward/back position, an up/down position, a left/right position, a pitch, a roll, and a yaw.

5. The method of claim 1, wherein detecting the first input comprises detecting an actuation of an input device of the handheld controller.

6. The method of claim 5, wherein detecting the actuation of the input device comprises detecting a press of a button of the handheld controller.

7. The method of claim 5, wherein detecting the second input comprises detecting a release of an input device of the handheld controller.

8. The method of claim 7, wherein detecting the release of an input device comprised detecting the release of a button.

9. A computer program product comprising a non-transitory storage medium, the computer program product including code that, when executed by processing circuitry of a virtual reality system configured to produce a virtual reality environment, causes the processing circuitry to perform a method, the method comprising:
   detecting a first input from a handheld controller of the virtual reality system;
   responsive to detecting the first input:
      communicatively coupling the handheld controller to a head-mounted display of the virtual reality system; and
      instructing a user to orient a handheld controller in a designated direction;
   detecting a second input from the handheld controller; and
   responsive to detecting the second input:
      determining a controller orientation of the handheld controller;
      determining a display orientation of the head-mounted display; and
      storing alignment data representative of an alignment of the handheld controller, the alignment data including data representative of an offset between the determined controller orientation and the determined display orientation.

10. The computer program product of claim 9, wherein communicatively coupling comprises establishing a connection via a short-range wireless signal.

11. The computer program product of claim 9, further comprising aligning at least a portion of a virtual reality scene displayed by the head-mounted display based on the alignment data.

12. The computer program product of claim 9, wherein instructing a user to orient a handheld controller in a designated direction comprises displaying instructions within a virtual reality scene displayed by the head-mounted display.

13. An electronic apparatus configured to produce a virtual reality environment, the electronic apparatus comprising:

a memory; and controlling circuitry coupled to the memory, the controlling circuitry being configured to:

detect a first input from a handheld controller of the virtual reality system;

responsive to detecting the first input:

communicatively couple the handheld controller to a head-mounted display of the virtual reality system via a wireless signal; and instruct a user to orient a handheld controller in a designated direction;

detect a second input from the handheld controller; and responsive to detecting the second input:

determine a controller orientation of the handheld controller;

determine a display orientation of a head-mounted display; and store alignment data representative of an alignment of the handheld controller, the alignment data including data representative of an offset between the determined controller orientation and the determined display orientation.

14. The electronic apparatus of claim 13, the controlling circuitry being further configured to coordinate movement of the handheld controller and the head-mounted display in a virtual reality scene based on the stored alignment data.

* * * * *